United States Patent Office 3,376,159
Patented Apr. 2, 1968

3,376,159
TREATMENT OF SILICEOUS FIBERS WITH AQUEOUS MIXTURES OF VARIOUS UNSATURATED POLY-IMIDAZOLINE ANCHORING AGENTS AND RESULTING ARTICLE
Thomas J. Drennen, Lafayette Hill, and Louis E. Kelley, Wyncote, Pa., assignors to Rohm & Haas Company, Philadelphia, Pa., a corporation of Delaware
No Drawing. Filed July 28, 1964, Ser. No. 385,759
6 Claims. (Cl. 117—126)

ABSTRACT OF THE DISCLOSURE

A water-soluble salt of a polymer containing at least 50 mole percent of units of the formula

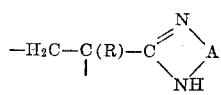

wherein

A is a ($C_2$–$C_3$)-alkylene group having at least 2 carbon atoms extending in a chain between the adjoined N atoms, and R is selected from the group consisting of H and $CH_3$ is used as an anchoring agent in the deposition of organic or inorganic materials suspended in water on to siliceous fibrous materials.

---

This invention is concerned with fibrous products formed of siliceous fibers, such as of glass and mineral wool fibers. It is particularly concerned with the treatment of fibers, filaments, yarns, cords, and fabrics of all sorts comprising siliceous fibers to effectively anchor to such materials a wide variety of other materials of either organic or inorganic types, thereby to modify the siliceous materials to render them more suitable for various uses.

In the past, it has been difficult to effectively anchor or adhere modifying materials to fibrous materials formed of siliceous fibers which are of acid character whenever moistened by aqueous media or must be dispersed in highly acid aqueous media as a preliminary to deposition thereon of a modifying material.

In accordance with the present invention, it has been discovered that certain polymeric materials are extremely efficient in aiding or anchoring depositions of modifying materials on fibrous products formed of or comprising in predominant proportion, siliceous fibers while in an acid environment.

The deposition aids or anchoring agents of the present invention are acid salts of a water-soluble polymer having an exclusively carbon atom "backbone" chain to which there are attached a plurality of nitrogenous rings of the formula

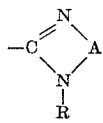 (I)

wherein

A is an alkylene group having from 2 to 6 carbon atoms, of which 2 to 3 only extend in a chain between the adjoined N atoms, and R is selected from the group consisting of H, ($C_1$–$C_6$)-alkyl, cyclohexyl, hydroxyl-substituted ($C_1$–$C_6$) alkyl groups and groups of the formula —$(ANH)_xH$ wherein A is as defined above and $x$ is an integer having a value of 1 to 4.

The nitrogenous ring may be connected directly to carbon atoms in the polymer chain or it may be connected through a phenylene group or through an ester or amide linkage. Thus, the typical polymerized unit of the polymers of the present invention may in most cases be represented generically by the following formula

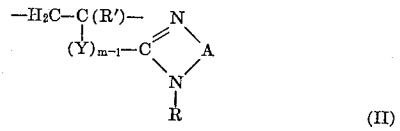 (II)

wherein

A and R are as defined hereinbefore,

R' is selected from the group consisting of H, ($C_1$–$C_2$) alkyl, phenyl, $C_7$-alkaryl, and

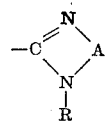

A and R being as defined above, $m$ is an integer having a value of 1 to 2, and

Y is selected from the group consisting of phenylene, $$O=\overset{|}{C}-O-Z-$$

and $$O=\overset{|}{C}-NH-Z-$$

wherein Z is a ($C_1$–$C_4$)alkyl group.

The preferred polymers are those in which each unit of Formula II contains only 5 to 8 carbon atoms, and optimum results are obtained with polymers in which such units contain only 5 carbon atoms, that is units of 2-vinyl-imidazoline-2.

To assure water-dispersibility of the polymers, the number of carbon atoms in each unit of Formula II should not exceed 12 carbon atoms. In general, the polymers used in accordance with the present invention contain at least 50 mole percent of units of Formula II and preferably about 90 to 100 mole percent thereof.

Preferred polymers are those containing 50 to 100 mole percent of units of the formula

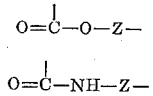 (III)

wherein

R is selected from the group consisting of H and $CH_3$ and A is a ($C_2$–$C_3$)-alkylene group having at least 2 carbon atoms extending in a chain between adjoined N atoms.

Preferred species include the polymers containing 50 to 100 mole percent of units of the formula

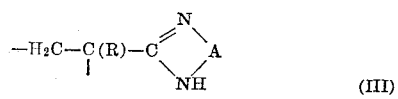 (IV)

which contain 2-imidazoline groups, or of the formula

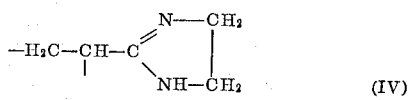 (V)

which contain 3,4,5,6-tetrahydropyrimidine groups, or of the formula

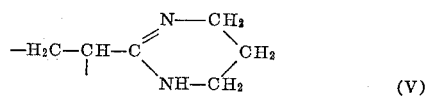

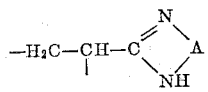

in which A is the propylene group $$(-CH_2-CH(CH_3)-)$$

and which contain C-methyl-substituted imidazoline-2 groups, or more specifically 4(or 5)-methyl-2-imidazoline groups.

The polymers containing units of Formula II are obtained by reacting, in the ways disclosed in copending U.S. application for patent S.N. 254,585, filed Jan. 29, 1963, an amine of the Formula VII with a polymer of a nitrile-containing monomer.

$$HN(R)-(ANH)_xH \qquad (VII)$$

wherein R, A, and $x$ are as defined hereinbefore. Examples of the amines include ethylenediamine
propylenediamine (i.e. 1,2-propanediamine)
trimethylenediamine (i.e. 1,3-propanediamine)
N-methyl-ethylenediamine
N-butyl-ethylenediamine
N-cyclohexyl-ethylenediamine
N-hydroxyethyl-ethylenediamine
N-(2-hydroxypropyl)-propylenediamine
diethylenetriamine
dipropylenetriamine
di-(trimethylene)-triamine
triethylenetetraamine
tetraethylenepentamine The polymers to be reacted with the amine of Formula VII include the homopolymers and copolymers of any polymerizable ethylenically unsaturated monomer containing at least one nitrile group. Examples of these monomers include acrylonitrile
methacrylonitrile
vinylidene cyanide
α-cyanostyrene
o-cyanostyrene
m-cyanostyrene
p-cyanostyrene
p-methyl-α-cyanostyrene
p-methyl-o-cyanostyrene
o-methyl-p-cyanostyrene The method of preparation of the polymeric deposition aids of the present invention is not per se claimed as part of the present invention. The disclosure of S.N. 254,585 in regard to the making of these polymers is incorporated herein by reference. All of the nitrile groups in the nitrile-containing polymer are converted into groups of Formula I.

It is essential that the polymer salts to be used as deposition aids be of water-soluble character. This term is meant to include both true solubility as well as that type of dispersibility in water characteristic of high molecular weight molecules, such as result in the so-called colloidal solutions or dispersions. The most efficient polymer salts are generally those having the highest hydrophilicity. Thus, the product obtained by reacting polyacrylonitrile of a molecular weight in the range of 500,000 to 10,000,000 viscosity average with at least an amount of ethylenediamine equivalent to the nitrile groups of the polymer so that the nitrile groups are replaced by imidazoline groups constitutes a preferred species.

However, any water-soluble salt of a polymer containing units of Formula II having a molecular weight in the range of about 500,000 to about 10,000,000 is capable of serving the purposes of the invention. The nitrile-containing polymer from which the deposition aid is obtained may thus be a copolymer of the unsaturated nitrile-containing monomer with up to 40 mole percent (or sometimes even up to 50 mole percent) of such non-hydrophilizing monomers as vinyl chloride, vinylidene chloride, vinyl esters of fatty acids, such as vinyl acetate, vinyl-aromatic hydrocarbons, such as styrene and vinyltoluenes, esters of acrylic or methacrylic acid with a saturated aliphatic alcohol having 1 to 18 carbon atoms, such as ethyl acrylate, butyl acrylate, or methyl methacrylate. The nitrile-containing monomer may be copolymerized with hydrophilizing monomers, such as acrylamide, methacrylamide, N-methylolacrylamide, β-hydroxyethyl acrylate, 4-vinylpyridine, dimethylaminoethyl methacrylate, and glycidyl acrylate. Such monomers may compensate for the tendency of other monomers or of hydrophobic constituents of the units of Formula II to reduce the water-dispersibility of the polymeric deposition aid. They may also serve to impart thermosetting qualities to the deposition aid so that on heating the modified fibrous product, the material deposited becomes more resistant to deformation or removal by subsequent application of heat, solvents, or water.

The acids that may be used to convert the polymer containing units of Formula II to the salt form may be any organic or inorganic acid or acid salt. The acid is preferably a strong acid. Examples include hydrochloric
hydrobromic
hydroiodic
sulfuric
ammonium sulfate
sodium bisulfate
potassium bisulfate
monomethyl hydrogen sulfate
sulfurous
sodium bisulfite
sulfonic
benzene sulfonic
p-toluene sulfonic
phosphoric
sodium acid phosphates
nitric
acetic
oxalic
propionic
tartaric
citric
sulfanic
glycolic
diglycolic
ethylenediaminetetraacetic The fibrous materials to be modified in accordance with the present invention are of siliceous character, such as exclusively of glass or mineral wool fibers or of blends thereof with each other or with other types of fibrous materials, such as wool, silk, cotton, rayon, wood pulps, cellulose esters, vinyl resins, such as polymers of acrylonitrile, vinylidene chloride, vinyl chloride, vinyl acetate and copolymers thereof, such as Saran, also polyvinyl alcohol, polyvinyl acetals, especially the formals, nylon, polyethylene glycol terephthalate, casein, and so on.

At the time of treatment, the fibrous product may be in any suitable form. For example, it may be in the form of a continuous-filament yarn, a spun yarn, a tow, sliver, roving, or cord. It may be in the form of a woven, knitted, or so-called "non-woven" fabric. It may be in the form of loose fibers in dry form or in the form of a fiber "pulp" dispersed in an aqueous medium from which the modified fibers may be formed into a "paper" or non-woven fabric.

The material to be deposited to modify the fibrous product may be a water-insoluble inorganic particulate material, such as a mineral filler or pigment to deluster or color the product or to make a so-called "filled" paper. It may be an organic material, such as a water-repellent, sizing, or anti-static agent. In this category, dispersed water-insoluble emulsion polymers are of particular importance. They are useful to bond fibers in the mass, to modify and especially to soften the feel of the fibrous mass, to increase the strength, either wet or dry or both, to lubricate and reduce the abrasiveness of the fiber product. When deposited during the formation of a sheet of "paper" or non-woven web or mat from an aqueous suspension or dispersion of the fibers, the polymer deposit serves to unify the fibrous material into an integral sheet and imparts one or more of the properties just mentioned to the sheet. The sheet may also be used as a reinforcement in articles molded with polyester, epoxy, aminoplast, or phenoplast resins. The particulate material to be deposited is preferably applied in the form of an aqueous dispersion or suspension of anionic or nonionic character.

The amount of organic or inorganic material to be deposited on the fibrous material may range from as low as about ½% to as high as 200%, based on the weight of the fibers before modification depending on the purpose of modification. The amount of polymeric deposition aid of the present invention needed to assure efficient deposition on the fibrous material is quite small, generally only about 0.005% to 2.0%, and preferably 0.1 to 0.5% by weight, based on the weight of glass fiber on which the organic or inorganic substance is to be deposited.

To assist those skilled in the art to practice the present invention, the following modes of operation are suggested by way of illustration, parts and percentages being by weight unless otherwise specifically noted. By "basis weight" of a paper is meant the weight in pounds of 3,000 square feet of the paper.

(1)

(a) 10 g. of commercially available essentially continuous glass fibers (composed of a mixture of 2.5 g. grade B ranging in diameter from 2.6 to 3.8 microns inclusive, 2.5 g. grade AA ranging in diameter from 0.75 to 1.59 microns inclusive, 2.5 g. grade AAA ranging in diameter from 0.5 to 0.749 micron inclusive, and 2.5 g. grade AAAA ranging in diameter from 0.2 to 0.499 micron inclusive—see Johns-Manville Celite Division's technical bulletin FF91B) are agitated in 2,000 ml. of water to yield a 0.5% consistency. The slurry is adjusted to a pH of 3.0 by adding hydrochloric acid in order to facilitate dispersion of the fibers. Then 2 mls. of a 0.5% solution in water of the sulfuric acid salt of a 2-vinyl-imidazoline-2 polymer (obtained by reaction of excess ethylenediamine on a polyacrylonitrile having a molecular weight of about 1.3 million viscosity average so that the nitrile groups are converted to imidazoline groups) is mixed with the pulp for about five minutes to assure exhaustion of the polymer on to the fiber surfaces.

(b) Then 20 mls. of a 2.5% aqueous dispersion of a water-insoluble emulsion copolymer of about 96% ethyl acrylate, 2.5% of N-methylolacrylamide, and about 1.5% of acrylamide stabilized by sodium octylphenoxydiethoxyethyl sulfonate is mixed with the pulp obtained in part (a) (5% copolymer solids based on fiber weight) and the mixture is agitated for about 5 minutes at which time practically all of the copolymer has been exhausted on the fibers.

(c) The resulting pulp is diluted uniformly with water while agitating to 0.2% consistency, diluted with water at pH of 3.0 (using HCl) to approximately a 0.04% consistency, and then sheeted, dried 2 minutes at 200° F., conditioned at 72° F. and 50% relative humidity and tested for dry strength. The sheet has a basis weight of approximately 50.6 lbs. and a dry tensile strength of about 1.45 lbs. per inch width whereas a corresponding unmodified sheet (basis weight about 52 lbs.) has a tensile strength of 0.37 lb. per inch width. In the final sheet, the lengths of the fibers range from about 0.01 to 0.5 inch with a mean length of about 0.12 to 0.15 inch.

(2)

Similar sheets are prepared by procedure (1) using twice the amount (giving a ratio of 10% copolymer solids based on fiber weight) of the following polymeric materials in aqueous dispersions in place of the copolymer dispersion applied in (1)(b):

Polymer 1.—A copolymer of about 90% methyl acrylate and 10% β-hydroxypropyl methacrylate stabilized with sodium lauryl sulfate.

Polymer 2.—A copolymer of about 51% ethyl acrylate, 45% methyl methacrylate, 2.5% N-methylolacrylamide and 1.5% acrylamide, stabilized by a mixture of sodium lauryl sulfate and diisobutylphenoxypoly(40)-ethoxyethanol.

Polymer 3.—A copolymer of about 85% ethyl acrylate, about 3% itaconic acid, and 12% methyl methacrylate stabilized by diisobutylphenoxypoly(40)ethoxyethanol.

Polymer 4.—A mixture of (1) a copolymer of about 43% of ethyl acrylate, 52% of methyl methacrylate and 5% of methacrylamide and (2) about 20%, based on the copolymer weight, of water-soluble melamine-formaldehyde condensate.

The following table gives the tensile strengths obtained:

| Polymer | Tensile Strength, lb. per inch width | Basis Weight |
|---|---|---|
| None | 0.37 | 52 |
| 1 | 2.4 | 46 |
| 2 | 4.0 | 46 |
| 3 | 1.2 | 48 |
| 4 | 4.5 | 54 |

(3)

To an aqueous suspension containing 1.2% of grade B glass fibers, 8.3% (on fiber) of rutile titanium dioxide, 1.7% of rosin size and 2.8% (both on fiber) of alum there is added 0.023% (on fiber) of a sodium bisulfate salt of a polymer of 2-(α-methyl-vinyl)-imidazoline-2 (obtained by reaction of excess ethylenediamine on polymethacrylonitrile having a viscosity average molecular weight of about one million so that the nitrile groups are converted to the imidazoline-2 groups). The suspension is diluted to 0.11% and adjusted to a pH of 4.4 with H₂SO₄. On sheeting, about 80% retention of titanium dioxide is obtained.

(4)

The procedure of (1) above is repeated but using in part (a) thereof a water-soluble hydrochloric acid salt of a polymer of 2-vinyl-3,4,5,6-tetrahydropyrimidine (obtained by the reaction of excess trimethylenediamine on a polyacrylonitrile having a viscosity average molecular weight of about 600,000 so that the nitrile groups are converted to tetrahydropyrimidine groups). Similar results ore obtained.

(5)

The procedure of (1) above is repeated but using in part (a) thereof a water-soluble p-toluene-sulfonic acid salt of a polymer of 2-vinyl-4(or 5)-methyl-2-imidazoline obtained by the reaction of excess 1,2-diaminopropane on a polyacrylonitrile having a viscosity average molecular weight of about 1.7 million so that the nitrile groups are replaced by substituted imidazoline groups. Papers of comparable improved strength are obtained.

(6)

A polymer obtained by reacting ethylenediamine with poly(acrylonitrile) having a molecular weight of about 1.7 million viscosity average so that the nitrile groups are converted to imidazoline groups (according to the co-pending U.S. application for patent S.N. 254,585 filed Jan. 29, 1963) is slurried in water at a concentration of 0.1% polymer solids in water. To this slurry 4 N sulfuric acid is added until the pH is 4.0. A web composed of glass fibers formed on a "Rando-webber" commonly used to form non-woven fabrics from textile fibers is passed through the above described polymer suspension on a supporting screen. The glass fiber web is dried and passed through a bath containing 20% by weight of an emulsion copolymer composed of 97.5% methyl acrylate and 2.5% itaconic acid stabilized by sodium lauryl sulfate. The resulting glass fiber web is made strong enough for further processing and handling. The same material made without the imidazoline anchor remains fluffy, weak, and poorly bonded.

(7)

The procedure of (6) above is repeated except a yarn made from glass fibers is dipped into the solution of poly(vinylimidazoline), removed, dried and impregnated by dipping into a 20% solids emulsion copolymer composed of 90% vinylidene chloride, 8% ethylacrylate, and 2% methacrylic acid. The yarn was unified, strengthened, and made strong in the presence of solvents such as toluene, acetone, and the like whereas a corresponding yarn impregnated with the emulsion copolymer but without having been pretreated with the poly(vinylimidazoline) anchoring agent was frayed, inferior in tensile strength, and not resistant to solvents.

(8)

The procedure of (6) above is repeated except that a woven fabric of glass yarns is dipped into a 0.5% solution of the poly(vinylimidazoline), squeezed between rollers to remove excess solution, dried in a circulating-air oven and then passed through a bath of an emulsion copolymer at 25% solids composed of 42.5% ethyl acrylate, 52.5% methylmethacrylate, and 5.0% methacrylamide plus 10%, based on the copolymer, of a melamine-formaldehyde condensate. The treated fabric was dried and baked at 150° C. for 10 minutes. The resulting material had strength to resist flowing solutions of water and solvent. The fibers were unified and adhered to each other. The impregnation of another piece of the same woven fabric with the same emulsion copolymer but without the poly(vinylimidazoline) anchoring agent were inferior in strength indicating that sufficient emulsion polymer binder was not picked up from the bath to give required strength for use as a filter.

(9)

A non-woven fabric with an average thickness of 0.016 inch is prepared from a randomly-laid web composed of glass fibers. The web is supported between pieces of glass fabric having an open weave and immersed in a bath containing 0.05% solution of the sulfuric acid salt of 2-vinylimidazoline-2-polymer and then passed through the squeeze rolls of a padder. The web is then treated with the acrylic polymer described in Example 2 by immersing the supported web in a 5 to 20% dispersion of the polymer. The excess is removed between squeeze rolls and the treated non-woven fabric dried in the usual manner.

(10)

A woven glass fiber fabric is treated in a washer by circulating the fabric in a 0.27% solution of the acetic acid salt of 2-vinylimidazoline-2 polymer for approximately 5 minutes to exhaust the anchoring agent on to the glass fabric. There is added 50% of an anionic acrylic polymer dispersion, the weight being based on the weight of fabric. The pH is adjusted to 6.0 with hydrochloric acid and the fabric is tumbled in the washer until complete deposition is obtained.

We claim:

1. A fibrous product comprising siliceous fibers carrying deposited on the surfaces thereof, about 0.005% to about 2.0% weight, based on the weight of the fibers, of a water-soluble salt of a polymer, having an exclusively carbon atom "backbone" chain and a molecular weight of about 500,000 to 10,000,000, of monoethylenically unsaturated molecules containing at least 50 mole percent of units of the formula

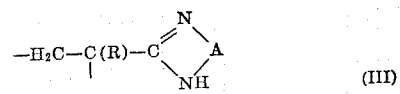

wherein

A is a ($C_2$–$C_3$)-alkylene group having at least 2 carbon atoms extending in a chain between the adjoined N atoms, and R is selected from the group consisting of H and $CH_3$.

2. A fibrous product comprising siliceous fibers carrying deposited on the surfaces thereof, about 0.005% to about 2.0% by weight, based on the weight of the fibers, of a water-soluble salt of a polymer, having an exclusively carbon atom "backbone" chain and a molecular weight of about 500,000 to 10,000,000 of monoethylenically unsaturated molecules, said polymer comprising 50 to 100 mole percent of at least one unit of the formula

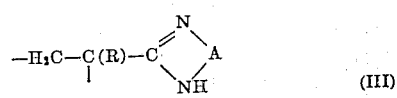

wherein

A is a ($C_2$–$C_3$)-alkylene group having at least 2 carbon atoms extending in a chain between the adjoined N atoms, and R is selected from the group consisting of H and $CH_3$.

3. A fibrous product comprising siliceous fibers carrying deposited on the surfaces thereof, about 0.005% to about 2.0% by weight, based on the weight of the fibers, of a polymer, having an exclusively carbon atom "backbone" chain and a molecular weight of about 500,000 to 10,000,000 of monoethylenically unsaturated molecules, said polymer comprising 50 to 100 mole percent of imidazoline-2-containing units of the formula

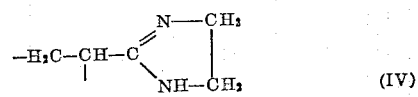

4. A fibrous product comprising siliceous fibers carrying deposited on the surfaces thereof, about 0.005% to about 2.0% by weight, based on the weight of the fibers, of a polymer, having an exclusively carbon atom "backbone" chain and a molecular weight of about 500,000 to 10,000,000 of monoethylenically unsaturated molecules, said polymer comprising 50 to 100 mole percent of 3,4,5,6-tetrahydropyrimidine-containing units of the formula

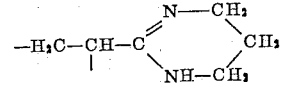

5. A fibrous product comprising siliceous fibers carrying deposited on the surfaces thereof, about 0.005% to about 2.0% by weight, based on the weight of the fibers, of a polymer, having an exclusively carbon atom "backbone" chain and a molecular weight of about 500,000 to 10,000,000 of monoethylenically unsaturated molecules, said polymer comprising 50 to 100 mole percent of 4(or 5)-methyl-2-imidazoline-containing units of the formula

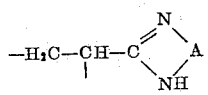

wherein

A is a propylene group of the formula

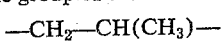

6. The method of modifying a fibrous product formed of siliceous fibers comprising applying thereto by means of an aqueous medium about 0.005% to about 2.0% by weight, based on the weight of the fibers, of a water-soluble salt of a polymer, having an exclusively carbon atom "backbone" chain and a molecular weight of about 500,000 to 10,000,000, of monoethylenically unsaturated molecules containing at least 50 mole percent of units of the formula

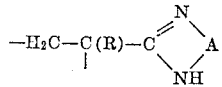

wherein

A is a $(C_2-C_3)$-alkylene group having at least 2 carbon atoms extending in a chain between the adjoined N atoms, and R is selected from the group consisting of H and $CH_3$, and bringing into contact with the fibrous product an aqueous medium of nonionic or anionic character containing suspended therein particles of a substance from the group consisting of organic and inorganic materials, the amount of particulate substance being about 0.5 to 200% by weight, based on the weight of fibers.

References Cited

UNITED STATES PATENTS

| | | | |
|---|---|---|---|
| 3,018,267 | 1/1962 | Steckler et al. | 117—124 |
| 3,097,963 | 7/1963 | Caroselli et al. | 117—126 |
| 3,166,525 | 1/1965 | Perry | 117—126 |

ALFRED L. LEAVITT, *Primary Examiner.*

RALPH S. KENDALL, *Examiner.*

H. COHEN, *Assistant Examiner.*